April 5, 1960     T. M. JACKSON     2,931,370
COMBINED CONDIMENT HOLDER AND TOOTHPICK
Filed Jan. 17, 1958

INVENTOR

THOMAS M. JACKSON,

BY
ATTORNEYS

2,931,370
COMBINED CONDIMENT HOLDER AND TOOTHPICK

Thomas M. Jackson, Odessa, Tex.

Application January 17, 1958, Serial No. 709,625

1 Claim. (Cl. 132—89)

This invention comprises a low cost, disposable combination device adapted for holding a small quantity of salt, pepper, or other condiments, and adapted for dispensing said condiments from one end of the device, the other being sharpened so as to be usable as a toothpick.

Restaurants, hotels, and other establishments in which food is served have a continual problem in that there is a substantial loss of condiment holders, that is, salt and pepper shakers, due to theft. The shakers are comparatively expensive, to an extent that makes the problem of less rather serious, due to the necessity of making purchases at frequent intervals of replacement items.

In view of the above, it is proposed to provide a low cost, disposable item that can be a complementary item, that is, it can be given to the customer and, thus, can even bear advertising matter designed to increase the business of the establishment. It is proposed, in carrying out this object, to provide a combination condiment holder and toothpick, thereby eliminating the necessity of purchasing relatively expensive salt and pepper shakers. Instead, the restaurant or other establishment may purchase the disposable items constituting the present invention in great quantity, keeping the supply of the same upon the table or counter, so that the customer may use the holder and may thereafter use it as a toothpick and take it with him when he leaves the establishment.

Another object of importance is to provide a combination device of the character stated which will be so designed that the condiment holding portion thereof constitutes a handle of substantial length and diameter, that can be gripped while the sharpened pick portion of the device is in use.

Still another object is to so form the device that the pick means will be of particularly substantial strength, adjacent its base, where it would otherwise tend to break.

Another object is to so form the condiment holding end portion that there is a solid area of substantial dimensions at the merger of the condiment holding portion and pick member, thus providing still more strength for the construction.

A further object of importance is to provide a device as stated which will be designed to hold a single application of salt and pepper, that is, the device is of small size, and can therefore be used to advantage at drive-in restaurants, or in preparing food to take out.

Other objects will appear from the following description, the claim appended thereto, and from the annexed drawing, in which like reference characters designate like parts throughout the several views, and wherein:

Figure 1:
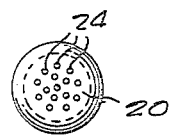
Figure 1 is a top plan view of a combination device according to the invention.

Referring to the drawing in detail, the device includes a condiment-holding handle portion 10 in the form of a straight, elongated, cylindrical member of molded plastic or the like, having a deep, axial recess 12 the wall of which merges into a rounded bottom wall 14 of the recess. The recess extends the full length of the handle portion, and as will be understood, the device would be of small size, so as to permit salt or pepper to be deposited in the recess only in an amount sufficient for a single use in a typical working ararngement or commercial embodiment.

Integral with the closed end of the handle portion 10 is an elongated pick element 16 coaxially aligned with handle portion 10 and progressively tapering in a direction from its proximal to its distal end. Element 16 at its distal end tapers to a sharp point, so that the element can be used as a toothpick. As will be noted, the bottom wall 14 is disposed inwardly from the base of the toothpick, and as a result, the closed end of the handle portion 10, and the wider base end of the pick element 16, provide a solid area 17 of substantial dimensions both in a direction transversely of the device and in a direction axially thereof, whereby to strengthen the device at the location of the connection between the pick element and the handle portion.

Figure 2:
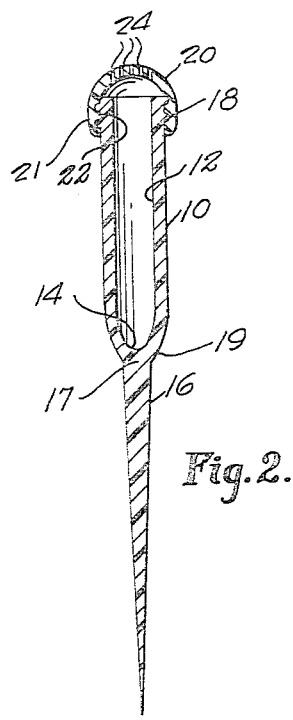
Figure 2 is a longitudinal sectional view therethrough.
Figure 3:
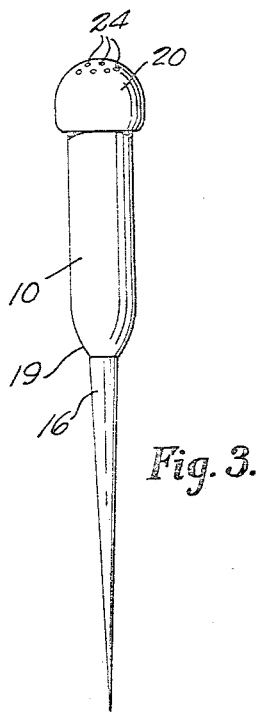
Figure 3 is a side elevational view thereof.
Figure 4:
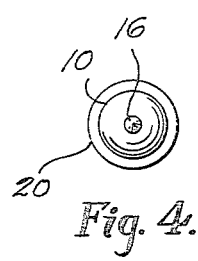
Figure 4 is an end elevational view, as seen from the end opposite that seen in Figure 1.

As will be noted from Figures 2 and 3, the handle portion is exteriorly tapered as at 19 at the end thereof into which the pick element 16 merges, being progressively reduced in outer diameter to the diameter of the base portion of the pick element.

At the open end of handle portion 10, the handle portion is formed with external threads 18 and a cap element 20 of approximately hemispherical shape has a cylindrical skirt 21 formed with internal threads 22 engaging threads 18.

In the arcuate dome portion of the cap 20 there are provided openings 24 through which the condiment is dispensed.

The construction combines in a single article a toothpick and condiment holder, and as will be noted, the toothpick is provided with a handle defined by the hollow body of the condiment holder, to facilitate manipulation of the toothpick. The construction is one that will permit the device to be made at a cost sufficiently low as to justify its being a disposable, single use item. This is particularly true when advertising is imprinted upon the outer surface of the device, as would generally be the case.

Further, the device is designed to cut down on extensive use of salt and pepper by customers, since it holds a comparatively small quantity of salt, or pepper. The quantity can be preselected so as to prevent any customer from using more than a predetermined, reasonable amount of the condiment.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A saltcellar including an elongated, straight, cylindrical member having an axial recess provided with an upper end opening through one end of the member, said recess extending the full length of the member and having a side wall imperforate over the full length of the recess, said side wall merging at the other end of the member into a rounded, wholly closed bottom wall of the recess; a perforate dispensing cap removably connected to said member at the upper end of the recess; and an elongated, pointed element having a proximal end integral with said bottom wall, said element projecting from said bottom wall as an axial extension of the member and tapering in a direction away from said member, said member and cap occupying approximately half the overall length of the saltcellar and said element occupying the remaining half so as to form with the member an elongated, handle-like formation the length of which is approximately double the length of the condiment-holding portion of the saltcellar.

References Cited in the file of this patent

UNITED STATES PATENTS

| | | |
|---|---|---|
| 360,460 | Nelson | Apr. 5, 1887 |
| 448,555 | Spooner | Mar. 17, 1891 |
| 1,779,843 | Gerstile | Oct. 28, 1930 |
| 2,098,832 | Payson | Nov. 9, 1937 |
| 2,386,085 | Babel | Oct. 2, 1945 |